United States Patent

[11] 3,629,856

[72] Inventors Takeshi Arai; Hideo Aizawa, both of Yokohama; Masashi Miura; Yoshio Numaho; Masahisa Takeya; Tasuku Yoshida; Noboru Ishibashi, all of Tokyo; Kaichiro Yamashita, Funabashi, all of Japan

[21] Appl. No. 21,119

[22] Filed Mar. 19, 1970

[45] Patented Dec. 21, 1971

[73] Assignee Tokyo Keiki Seizosho Co., Ltd. Tokyo, Japan

[32] Priority Mar. 22, 1969

[33] Japan

[31] 44/21415

[54] MULTICHANNEL SIGNAL-PROCESSING SYSTEM

11 Claims, 15 Drawing Figs.

[52] U.S. Cl. .......... 340/172.5

[51] Int. Cl. .......... G06f 3/04

[50] Field of Search .......... 340/172.5

[56] References Cited

UNITED STATES PATENTS

| | | | |
|---|---|---|---|
| 3,516,072 | 6/1970 | Wallace .......... | 340/172.5 |
| 3,413,612 | 11/1968 | Brooks et al. .......... | 340/172.5 |
| 3,331,055 | 7/1967 | Betz et al. .......... | 340/172.5 |

*Primary Examiner*—Gareth D. Shaw

*Assistant Examiner*—Ronald F. Chapuran

*Attorney*—Hill, Sherman, Meroni, Gross & Simpson

ABSTRACT: A multichannel signal-processing system having a simplified arrangement wherein multiple signal channel-selecting circuits for multiple channel input signals and a supplementary channel-selecting circuit or circuits corresponding to single or plural data available from supplementary circuit or circuits each having a data source is loop connected in series with each other in a predetermined order in the form of a ring counter, said signal channel-selecting circuits and said supplementary channel-selecting circuit or circuits are driven in a predetermined order so that the multiple channel input signals and the single or plural data may be successively selected, and the multiple channel input signals of the multiple channel input signals and single or plural data selected in the predetermined order as described above are processed in a signal-processing circuit controlled by a main control circuit, whereas the single or plural data are supplied to the main control circuit to constitute control signal to control the signal-processing circuit.

INVENTORS
TAKESHI ARAI, HIDEO AIZAWA,
MASASHI MIURA, YOSHIO NUMAHO,
MASAHISA TAKEYA, TASUKU YOSHIDA,
NOBORU ISHIBASHI & KAICHIRO YAMASHITA

Hill, Sherman, Meroni, Gross & Simpson
ATTORNEY

INVENTORS
TAKESHI ARAI, HIDEO AIZAWA,
MASASHI MIURA, YOSHIO NUMAHO,
MASAHISA TAKEYA, TASUKU YOSHIDA,
NOBORU ISHIBASHI & KAICHIRO YAMASHITA

Hill, Sherman, Meroni, Gross & Simpson
ATTORNEY

INVENTORS
TAKESHI ARAI, HIDEO AIZAWA,
MASASHI MIURA, YOSHIO NUMAHO,
MASAHISA TAKEYA, TASUKU YOSHIDA,
NOBORU ISHIBASHI & KAICHIRO YAMASHITA

Hill, Sherman, Meroni, Gross & Simpson
ATTORNEY

INVENTORS
TAKESHI ARAI, HIDEO AIZAWA,
MASASHI MIURA, YOSHIO NUMAHO,
MASAHISA TAKEYA, TASUKU YOSHIDA,
NOBORU ISHIBASHI & KAICHIRO YAMASHITA

Hill, Sherman, Meroni, Gross & Simpson
ATTORNEY

INVENTORS
TAKESHI ARAI, HIDEO AIZAWA, MASASHI MIURA, YOSHIO NUMAHO, MASAHISA TAKEYA, TASUKU YOSHIDA, NOBORU ISHIBASHI & KAICHIRO YAMASHITA

Hill, Sherman, Meroni, Gross & Simpson
ATTORNEY

INVENTORS
TAKESHI ARAI, HIDEO AIZAWA,
MASASHI MIURA, YOSHIO NUMAHO,
MASAHISA TAKEYA, TASUKU YOSHIDA,
NOBORU ISHIBASHI & KAICHIRO YAMASHITA

Hill, Sherman, Meroni, Gross & Simpson
ATTORNEY

INVENTORS
TAKESHI ARAI, HIDEO AIZAWA,
MASASHI MIURA, YOSHIO NUMAHO,
MASAHISA TAKEYA, TASUKU YOSHIDA,
NOBORU ISHIBASHI, & KAICHIRO YAMASHITA

Hill, Sherman, Meroni, Gross & Simpson
ATTORNEY

MULTICHANNEL SIGNAL-PROCESSING SYSTEM

BACKGROUND OF THE INVENTION FIELD OF THE INVENTION

This invention relates to a multichannel signal-processing system wherein input signals are successively supplied to a signal-processing circuit controlled by a main control circuit so as to be processed thereby.

SUMMARY OF THE INVENTION

According to an aspect of the present invention, there is provided a simplified arrangement wherein multiple channel signal-selecting circuits for multiple channel input signals are loop connected in series with each other in the form of a ring counter, and the multiple signal channel-selecting circuits are driven in a predetermined order so that the multiple channel input signals may be successively selected.

According to another aspect of the present invention, there is provided a simplified arrangement wherein multiple signal channel-selecting circuits for multiple channel input signals and a supplementary channel selecting circuit or circuits corresponding to signal or plural data available from supplementary circuit or circuits each having a data source are loop connected in series with each other in a predetermined order in the form of a ring counter, and said signal channel-selecting circuits and said supplementary channel-selecting circuit or circuits are driven in a predetermined order so that the multiple channel input signals and the single or plural data may be successively selected.

According to a third aspect of the present invention, the multiple channel input signals of the multiple channel input signals and single or plural data selected in the predetermined order as described above are processed in the signal-processing circuit controlled by the main control circuit, whereas the single or plural data are supplied to the main control circuit to constitute control signal to control signal-processing circuit.

According to a fourth aspect of the present invention, selection of the single or plural data is effected simultaneously with the successive selection of the multiple channel input signals successively selected in the predetermined order as determined above, the selected channel input signals are processed in control modes peculiar thereto respectively.

According to a fifth aspect of the present invention, in the course of the successive selection of the multiple input signals described above, if an "abnormal" condition occurs in any one of these signals, then there is provided "abnormal" detection data indicating that channel in which such an abnormal condition has occurred.

Other objects, features and advantages of the present invention will become apparent from the following description taken in conjunction with the accompany drawings.

DESCRIPTION OF THE PREFERRED EMBODIMENTS

Figure 1:
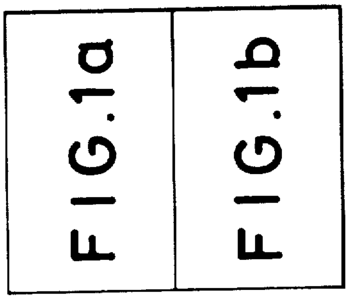
FIG. 1 is a view showing the arrangement of FIGS. 1*a* and 1*b*.
Figure 1A:
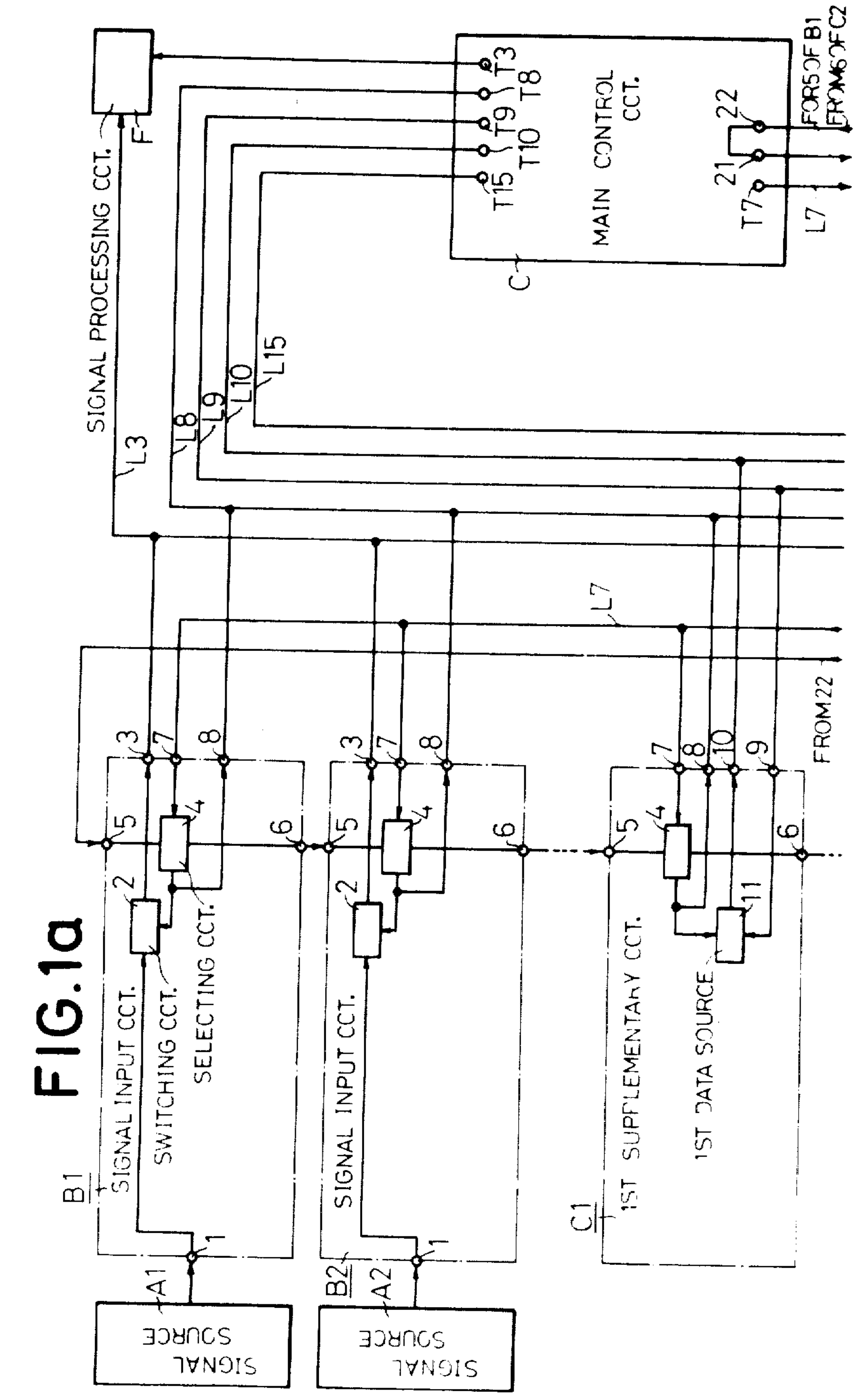
FIGS. 1*a* and 1*b* are schematic diagrams showing the multichannel signal-processing system according to an embodiment of the present invention respectively.
Figure 1B:
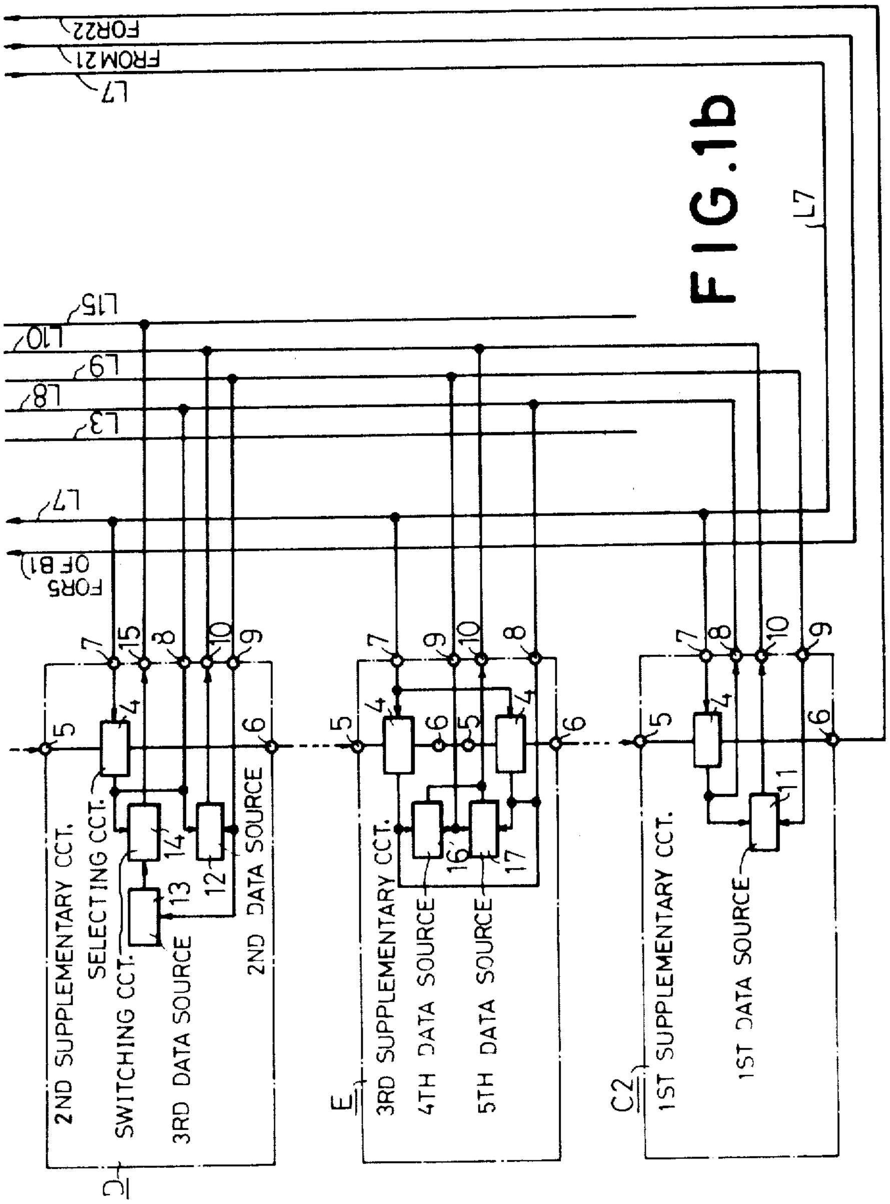

Referring first to FIGS. 1*a*, 1*b* and 1 of the drawings, $A_1$, $A_2$,...,$A_N$ indicate channel signal sources the total number of which is N. (For the sake of simplicity, only $A_1$ and $A_2$ are shown in the drawings.) Signal input circuits $B_1$, $B_2$,...,$B_N$ are provided which are associated with these channel signal sources $A_1$, $A_2$,...,$A_N$ respectively. Each of these signal input circuits $B_1$, $B_2$,...,$B_N$ is designed so that input signal supplied to input terminal 1 is passed to output terminal 3 through switch circuit 2 which is adapted to be closed under the control of channel selection signal provided by channel-selecting circuit 4.

Each of the channel-selecting circuits 4 corresponds to each one-digit portion of a ring counter which is constituted by a plurality of signal input circuits and supplementary or auxiliary circuits, as will become apparent later. Input and output terminals 5 and 6 shift pulse input terminal 7 are led out of each channel-selecting circuit 4, channel selection signal available therefrom being obtained at output terminal 8.

$C_1$ and $C_2$ represent supplementary or auxiliary circuits each of which includes a first data source 11 such as a memory circuit having required first data stored therein or encoder adapted to provide such first data. Each of these auxiliary circuits also includes a channel-selecting circuit 4 as is the case with the input circuits $B_1$, $B_2$,...,$B_N$, wherein first data source is controlled by the channel-selecting circuit 4 and made to provide the first data at output terminal 10 by timing pulse appearing at timing pulse input terminal 9. Further, led out of each channel-selecting circuit 4 are input and output terminals 5 and 6, shift pulse input terminal 7 and channel selection signal output terminal 8.

D indicates a second supplementary or auxiliary circuit which includes a second data source 12 such as memory circuit having required second data stored therein or encoder adapted to provide such second data, a third data source 13 such as memory circuit having required third data stored therein, and a channel-selecting circuit 4 similar to those of the input circuits $B_1$, $B_2$,...,$B_N$. The third data source 13 provides the third data under the control of timing pulse imparted thereto from the terminal 9, and the third data is passed to output terminal 15 through a switching circuit 14 which is controlled by channel selection signal provided by the channel selecting circuit 4. Further, the second signal source 12, which is controlled by the channel-selecting circuit 4, is made to provide the second data at the output terminal 10 by timing pulse imparted thereto from the terminal 9. In this case, too, input and output terminals 5 and 6, shift pulse input terminal 7 and output terminal 8 are led out of the channel-selecting circuit 4.

E denotes a third supplementary or auxiliary circuit which includes a plurality of, say two, channel-selecting circuits 4 similar to that incorporated in each of the input circuits $B_1$, $B_2$,...,$B_N$, and fourth and fifth data sources 16 and 17 such as memory circuits having fourth and fifth data stored therein respectively or encoders adapted to provide such fourth and fifth data respectively which are associated with the two channel-selecting circuits 4 respectively. The fourth and fifth data sources 16 and 17 are made to provide fourth and fifth data at output terminal 10 by pulses imparted thereto from input terminal 9 under the control of the two selector circuits 4 respectively. Each of these two selector circuits 4 also includes input and output terminals 5 and 6, the output terminal 6 of one of the circuits 4 being internally connected with the input terminal 5 of the other circuit 4, the input terminal 5 of said other circuit 4 and output terminal 6 of said one circuit 4 being led out. The shift pulse input terminals of the two circuits 4 are connected with a common shift pulse input terminal 7, and the output terminals of the two circuits 4 are led out as output terminal 8.

Furthermore, for example, the input terminal 5 of the channel-selecting circuit 4 incorporated in the circuit $B_1$ is connected with terminal 21 of main control circuit C; the output terminal 6 of the selector circuit 4 incorporated in the second supplementary circuit $C_2$ is coupled to terminal 22 of the main control circuit C, the terminals 21 and 22 being connected with each other in the main control circuit C; output terminal 6 of the selector circuit 4 included the circuits $B_1$ is connected with the input terminal 5 of the selector circuit 4 contained in the circuit $B_2$; the output terminal 6 of the selector circuit 4 provided in the circuit $B_2$ is connected with the input terminal 5 of the circuit 4 incorporated in the circuit $B_3$; and so on. The output terminal 6 of the circuit 4 provided in the $(j-1)$st signal input circuit $B_{j-1}$ is coupled to the input terminal 5 of the circuit 4 included in the first supplementary circuit $C_1$; the output terminal 6 of the circuit 4 of the circuit $C_1$ is connected with the input terminal 5 of the circuit 4 of the $j$th signal input circuit $B_j$; the output terminal 5 of the circuit 4 contained in the $j$th circuit $B_j$ is connected with the input terminal 5 of the circuit contained in the $(j+1)$st circuit $B_{j+1}$; and so on. The output terminal 6 of the $(k-1)$st signal input circuit $B_{k-1}$ is connected with the input terminal 5 of the second supplementary circuit D; the output terminal 6 of the supplementary circuit D is connected with the $k$th input terminal 5 of the $k$th signal input circuit $B_k$; and so on. The output terminal 6 of the $(l-1)$st signal input circuit $B_{l-l}$ is connected with the input terminal 5 of the second supplementary circuit 6 of the supplementary circuit E is connected with the terminal 5 of the $l$th signal input circuit $B_l$; and so on. The output terminal 6 of the Nth signal input circuit $B_N$ is connected with the input terminal 5 of the second supplementary circuit $C_2$. Thus, the channel selecting circuits of these signal input circuits and last, second and third supplementary circuits are serially connected in such a manner as $B_1$—$B_2$—,,,,,—$B_{j-1}$—$C_1$—$B_j$.....—$B_{k-1}$—D—$B_k\alpha\zeta$·····—$B_{l-1}$—E—$B_l$—.....—$B_{N-1}$—$B_N$—$C_2$ so as to constitute a loop as a whole. The shift pulse input terminals 7 of the selector circuits 4 in the circuits $B_1$, $B_2$,.....,$C_1$ and $C_2$, D, E are connected with shift pulse input terminal $T_7$ of the main control circuit C through a common line $L_7$.

Output terminals 3 of the switches 2 provided in the circuits $B_1$, $B_2$;...,$B_N$ are connected with a signal-processing circuit F through a common line $L_3$. This signal-processing circuit F is adapted to be controlled by a control signal obtained at a terminal $T_3$ of the main control circuit C.

Furthermore, the output terminals 8 of the selector circuits 4 contained in the circuit $B_1$, $B_2$,...,$B_N$, $C_1$ and $C_2$, D and E are connected with channel selection signal input terminal 8 of the main control circuit C through a common line $L_8$.

Still furthermore, the data output terminals 10 of the supplementary circuits $C_1$ and $C_2$, D and E are connected with data input terminal $T_{10}$ of the main control circuit C through a common line $L_{10}$.

The timing pulse input terminals 9 of the auxiliary circuits $C_1$ and $C_2$, D and E are connected with timing pulse output terminal $T_9$ of the main control circuit C through a common line $L_9$, and the output terminal 15 on the output side of the switch 14 of the second supplementary circuit D is coupled to data input terminal $T_{15}$ of the main control circuit C through a $L_{15}$.

In operation, when shift pulses successively occur at the terminal $T_7$ of the main control circuit C while input signals available from the signal sources $A_1$, $A_2$,...,$A_N$ are being supplied to the input terminals 1 of the input circuits $B_1$, $B_2$,...,$B_N$ respectively, the selector circuits 4 incorporated in the circuits $B_1$, $B_2$,...,$B_N$ are successively energized so that the switches 2 are closed as to permit the signals from the signal sources $A_1$, $A_2$,...,$A_N$ to be successively passed to the signal-processing circuit F through the line $L_3$. Thus, the signals are processed by the circuit F while the latter is being controlled by the main control circuit C. This will be readily apparent to those skilled in the art.

After the circuit 4 of the circuit $B_{j-1}$ is driven so that the signal from the signal source $A_{j-l}$ is supplied to the signal-processing circuit F, the circuit 4 of the first supplementary circuit $C_1$ will be driven the output of which will in turn be imparted to the first data source 11 to which timing pulse is also provided from the terminal $T_9$ of the main control circuit C through the line $L_9$ and terminal 9. Thus, the first data available from the first data source 11 of the circuit $C_1$ will be supplied to terminal $T_{10}$ of the main control circuit C through line $L_{10}$ so that upon arrival of the first data, the main control circuit C will provide at the terminal $T_3$ a control signal by which the signal-processing circuit F be controlled. Subsequently, the circuits 4 of the signal input circuits $B_j$, $B_{j+1}$,... will be driven, so that signals from the signal sources $A_j$, $A_{j+1}$,... will be similarly supplied to the signal processing circuit F so as to be processed.

After the circuit 4 in the circuit $B_{k+1}$ is driven so that the signal of the signal source $A_{k+1}$ is supplied a to the signal processing circuit F, the circuit 4 incorporated in the second supplementary circuit D will be driven so that the switch circuit 14 of the circuit D will be closed so as to permit timing pulse to be imparted from the terminal 9 to the third data source 13 through line $L_9$, with a result that the third data is passed to terminal $T_{15}$ of the main control circuit through terminal 15 and line $L_{15}$. Thus, upon arrival of the third data, the main control circuit C will provide to the signal-processing circuit F a control signal based upon this third data. At this point, since the output of the circuit 4 and hence timing pulse will also be imparted to the second data source 12, there will be provided third data, which will in turn be passed to the main control circuit through line $L_{10}$ so that the main control circuit C will provide a control signal similar to the aforementioned one by which the signal-processing circuit F will be controlled.

Subsequently, the circuits 4 in the circuits $B_k$, $A_{k+1}$,... will be driven so that signals of the signal source $A_k$, $A_{k+1}$,... will be supplied to the signal-processing circuit F so as to be processed, as described above.

After the circuit 4 in the circuit $B_{1-l}$ is driven so that the signal of the signal source $A_{1-1}$ is supplied to the signal-processing circuit F, two circuits 4 in the third supplementary circuit E will be successively driven the outputs of which will in turn be provided to the fourth and fifth data sources 16 and 17 respectively. Since these data sources 16 and 17 are provided with timing pulses as in the aforementioned cases, fourth and fifth data are obtained therefrom successively which will in turn be passed to the main control circuit C through the line 10, so as that the main control circuit C will provide a control signal similar to the aforementioned ones by which the signal-processing circuit F will be controlled.

Subsequently, the circuits 4 in the circuits $B_l$, $B_{l+1}$,... will be driven so that signals of the signal sources $A_1$, $A_{1+1}$,... will be supplied to the signal-processing circuit F so as to be processed, as in the foregoing cases.

Thus, after the circuit 4 incorporated in the circuit $B_N$ is driven so that signals of the signal source $A_N$ are supplied to the signal-processing circuit F, the circuit 4 in the first supplementary circuit $C_2$ will be so driven as to operate in the same manner as the first supplementary circuit $C_1$.

At this point, a cycle of operation is completed, and such an operational cycle is repeated. During repetition of the operation cycle, the circuits 4 in the circuits $B_1$, $B_2$,...,$B_N$, $C_1$ and $C_2$, D and E provide at terminals 8 channel selection signals, which are supplied to the main control circuit C so as to be utilized as control signals for the main control circuit C.

In practice, assuming that the signal-processing circuit F includes a recorder for example, the aforementioned first supplementary circuits $C_1$ and $C_2$ serve to change the recording mode of the recorder while signals of the signal sources are being successively processed by the signal-processing circuit F. Data required for this purpose is obtained from the first data source 11. Further, during the processing of signals from the signal sources in a predetermined order by the signal processing circuit F for example, the second supplementary circuit D serves to permit the signal processing to "jump" the predetermined order. Thus, data for the jump operation is obtained from the second data source 12, and data indicating jump position for example is obtained from the third data source. During the processing of signals in a predetermined order by the signal-processing circuit F, the third supplementary circuit D serves to temporarily stop the signal processing. Data for this purpose are obtained from the fourth and fifth data sources 16 and 17.

Description will now be made of a second embodiment of the present invention with reference to FIGS. 1*a*, 2*b* and 2. In this embodiment, in each of the signal input circuits $B_1$, $B_2$,...$B_N$, signal input terminal 1 is connected with output terminal 3 through switch circuit 2, and the switch circuit 2 is controlled and driven by the circuit 4 as in the embodiment described above in connection with FIGS. 1*a*, 1*b* and 1. This embodiment is similar to that shown in FIGS. 1*a*, 1*b* and except that in each signal input circuit $B_1$, $B_2$,...,$B_N$, there is provided a memory circuit 8 in which data peculiar to each input circuit such for example as the number assigned to each input circuit, type of input signal supplied to each input circuit or magnitude of a reference level signal for the input signal to each input circuit is stored as sixth data, and there is also provided a switch circuit 14 corresponding to the switch circuit 14 in the second supplementary circuit D, each switch circuit 14 being adapted to be driven by the output of each circuit 4, each memory circuit 8 being driven by timing pulse occuring at terminal 9 so that sixth data is taken out therefrom which in turn is passed to each output terminal 15 through each switch circuit 14. The terminals 9 and 15 are coupled to the lines $L_9$ and $L_{15}$ described above in connection with FIGS. 1*a*, 1*b* and 1 respectively.

Figure 2:
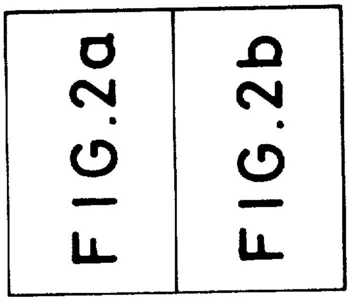
FIG. 2 is a view showing the arrangement of FIGS. 2*a* and 2*b*.
Figure 2A:
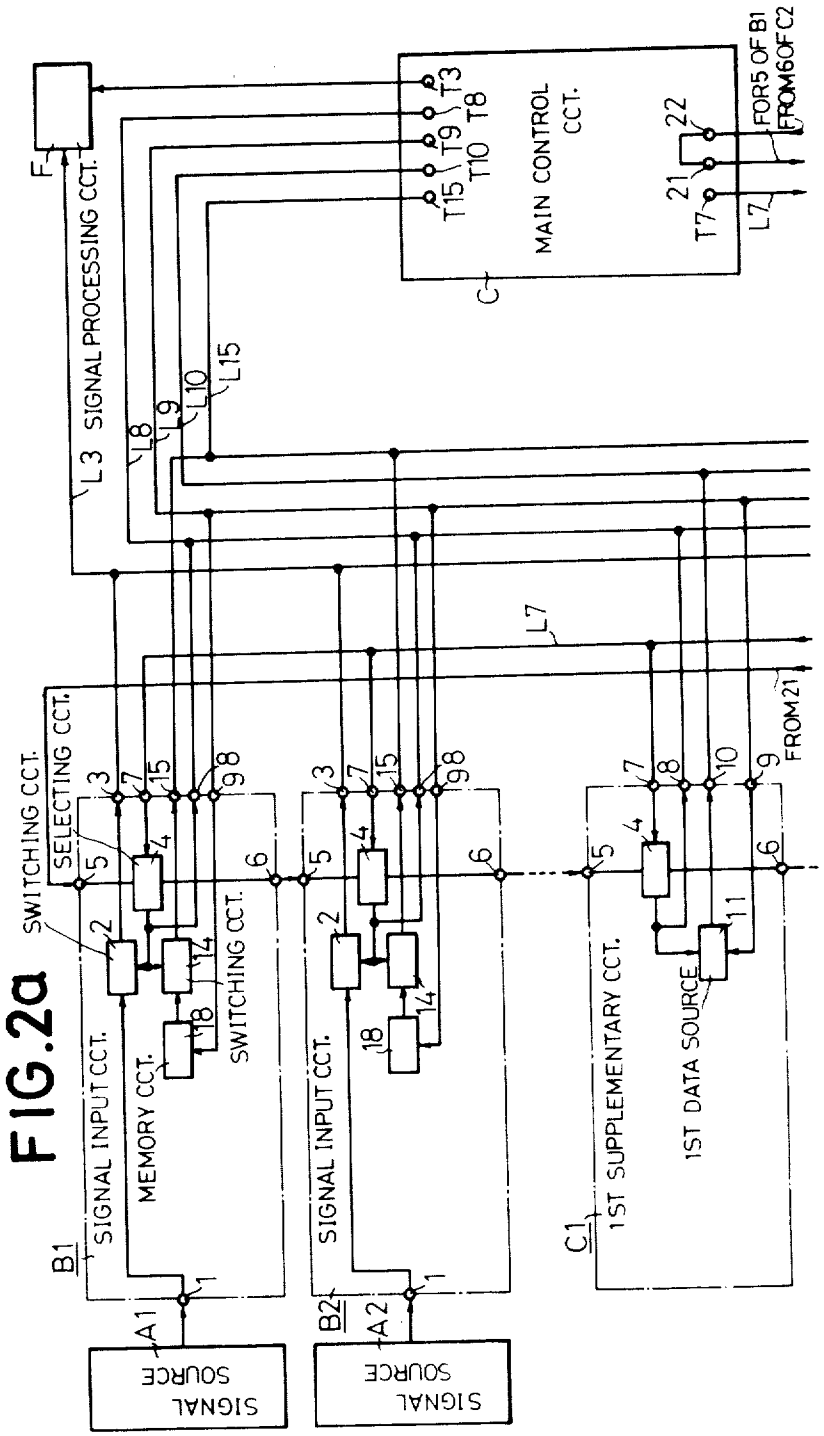
FIGS. 2*a* and 2*b* are schematic diagrams showing the multichannel signal-processing system according to a second embodiment of the present invention, respectively.

With the arrangement shown in FIGS. 2*a*, 1*b* and 2, operational effect similar to that described above in connection with FIGS. 1*a*, 1*b* and 1 can be produced. Furthermore, since six data specific to each circuit $B_1$, $B_2$,...,$B_N$ can be successively supplied therefrom to the main control circuit C, signals from each signal source $A_1$, $A_2$,... can be produced in a mode specific to each signal based upon the sixth data by the signal processing circuit F.

Figure 3:
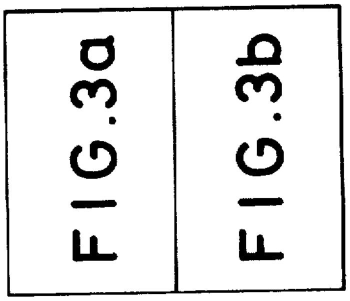
FIG. 3 is a view showing the arrangement of FIGS. 3*a* and 3*b*.
Figure 3A:
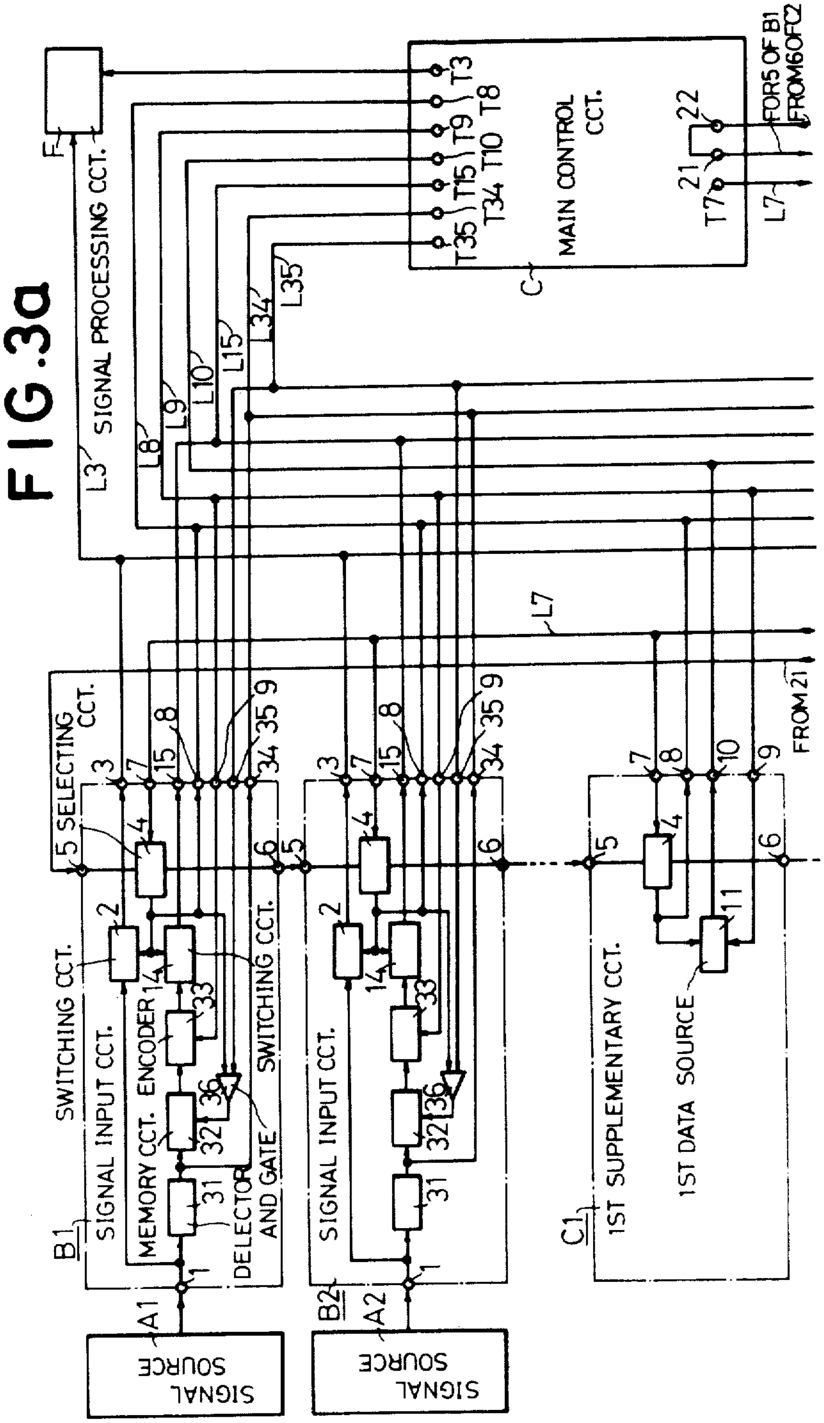
FIGS. 3*a* and 3*b* are schematic diagrams showing the multichannel signal-processing system according to a third embodiment of the present invention, respectively.
Figure 3B:
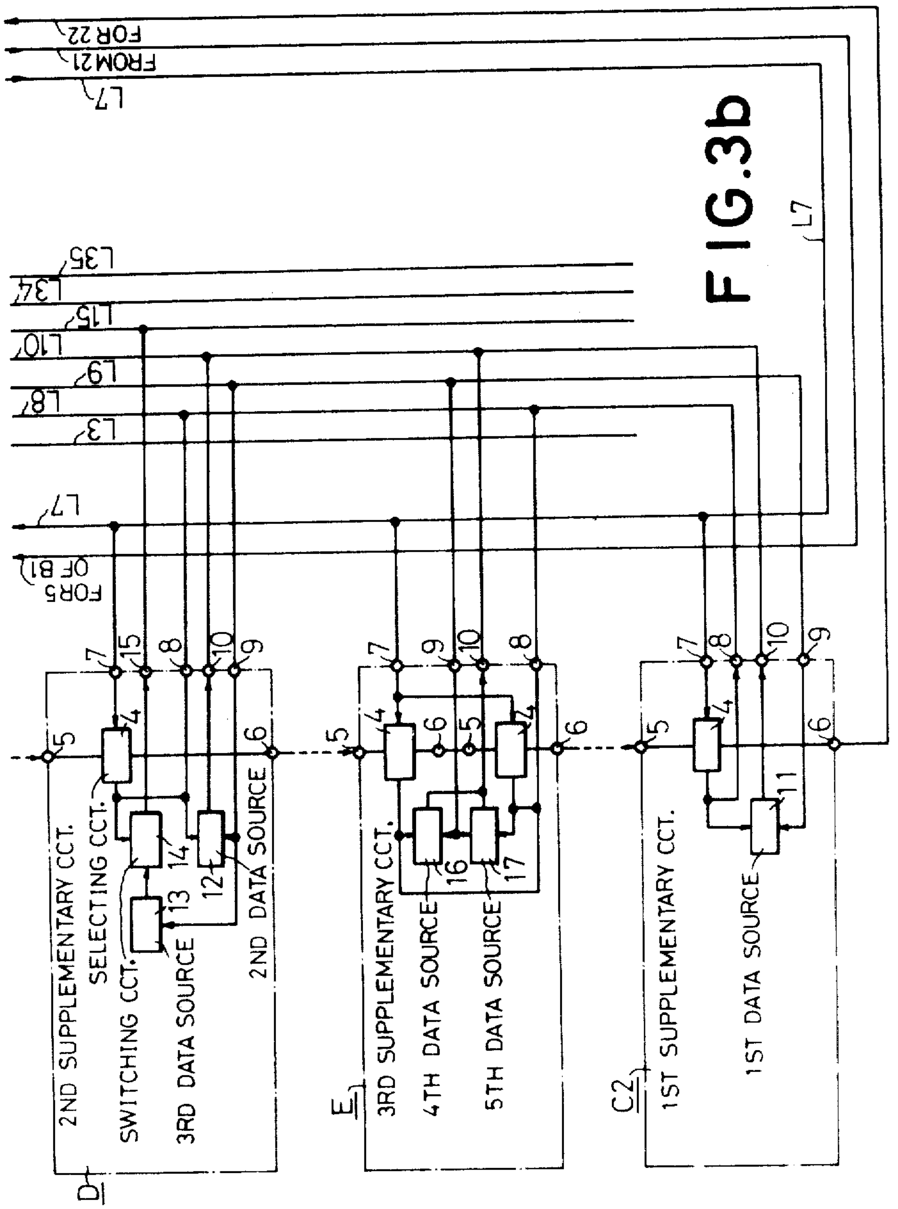

Referring to FIGS. 3*a*, 3*b* and 3. there is shown a third embodiment of the present invention wherein, in each signal input circuit, input terminal 1 is connected with output terminal 3 through switch circuit 2, and the switch circuit 2 is controlled and driven by channel-selecting circuit 4 as in the embodiment described above in connection with FIGS. 1*a*, 1*b* and 1. This embodiment is similar to the embodiment shown in FIGS. 1*a*, and 1*b* and 1 that in each signal input circuit $B_1$, $B_2$,...,$B_N$, input signal arriving at input terminal 1 is supplied to abnormal detector 31 including an internal setter adapted to detect whether the input signal is abnormal or not, abnormal detection signal available from said detector 31 is supplied to a memory circuit 32 to be stored therein the memory output of which is passed to encoder 33 which provides abnormal detection data which in turn is passed to output terminal 15 through switch circuit 14 driven by the output of the selector circuit 4, the encoder 33 is adapted to be controlled and driven by timing pulse occuring at terminal 9, output of the abnormal detector 31 is obtained at terminal 34, abnormal confirmation signal occurring at terminal 35 and output of the circuit 4 are passed to AND-circuit 36, and the memory circuit 32 is reset by the output of the AND-circuit 36. The terminals 9 and 15 are connected with the lines $L_9$ and $L_{15}$ described above in connection with FIGS. 1*a*, 1*b* and 1, and the terminals 34 and 35 are coupled to abnormal detection signal input terminal $T_{34}$ and abnormal confirmation signal output terminal $T_{35}$ of the main control circuit C through common lines $L_{34}$ and $L_{35}$ respectively. The remaining portions of this embodiment are arranged in the same manner as the embodiment described above in connection with FIGS. 1*a*, 1*b* and 1.

With the arrangement of FIG. 3, if abnormal condition occurs in any one of the signal sources $A_1$, $A_2$,...,$A_N$, then abnormal detection signals is provided by the abnormal detector 31 incorporated in one of the circuits $B_1$, $B_2$,...,$B_n$, and the signal will be supplied to the main control circuit C through the line $L_{34}$ so that the main control circuit C will detect the fact that abnormal condition has occurred in any of the signal sources $A_1$, $A_2$,...,$A_N$ and thus is successively sends out shift pulses at the terminal $T_7$, performing operation similar to that described above in connection with FIGS. 1*a*, 1*b* and 1.

During this operation, if it is assumed that the abnormal condition has occurred in the signal source $A_1$ for example, then abnormal detection signal will be provided by the abnormal detector 31 of the circuit $B_1$ and this signal will be stored in the memory circuit 32 and converted to abnormal detection data by the encoder 33. When the circuit 4 in the circuit $B_1$ is selectively drive, such abnormal detection data will be passed to the terminal $T_{15}$ of the main control circuit C through the switch 14 and line $L_{15}$, so that the main control circuit C will detect the fact that the abnormal condition has occurred in the signal source $A_1$. Upon this detection, a confirmation signal will occur at the terminal $T_{35}$, and it will be imparted to the gate 36 of the circuit $B_1$ through the line $L_{35}$, so that the memory circuit 32 will be reset by the output of the gate 36. Although, in the foregoing, description has been made of several particular embodiments of the present invention, it is also possible to use only a plurality of signal input circuits shown in FIG. 1*a*; a combination of plural signal input circuits shown in FIG. 1*a* and one or plural first supplementary circuits described above in connection with FIGS. 1*a* and 1*b*; a combination of a plurality of signal input circuits shown in FIG. 1*a* and one or plural second supplementary circuits shown in FIG. 1*b*; a combination of plural signal input circuits shown in FIG. 1*a* and one or plural third supplementary circuits shown in FIG. 1*b*; a combination of plural signal input circuits shown in FIG. 1*a*, one or plural first supplementary circuits shown in FIGS. 1*a* and 1*b* and one or plural second supplementary circuits shown in FIG. 1*b*; a combination of plural signal input circuits shown in FIG. 1*a*, one or plural first supplementary circuits shown in FIGS. 1*a* and 1*b* and one or plural third supplementary circuits shown in FIG. 1*b*; a combination of plural signal input circuits shown in FIG. 1*a*, one or plural second supplementary circuits shown in FIG. 1*b* and one or plural third supplementary circuits shown in FIG. 1*b*; or a combination of plural signal input circuits shown in FIG. 1*a* and each one or plurality of first, second and third supplementary circuits shown in FIGS. 1*a* and 1*b*.

Figure 2B:
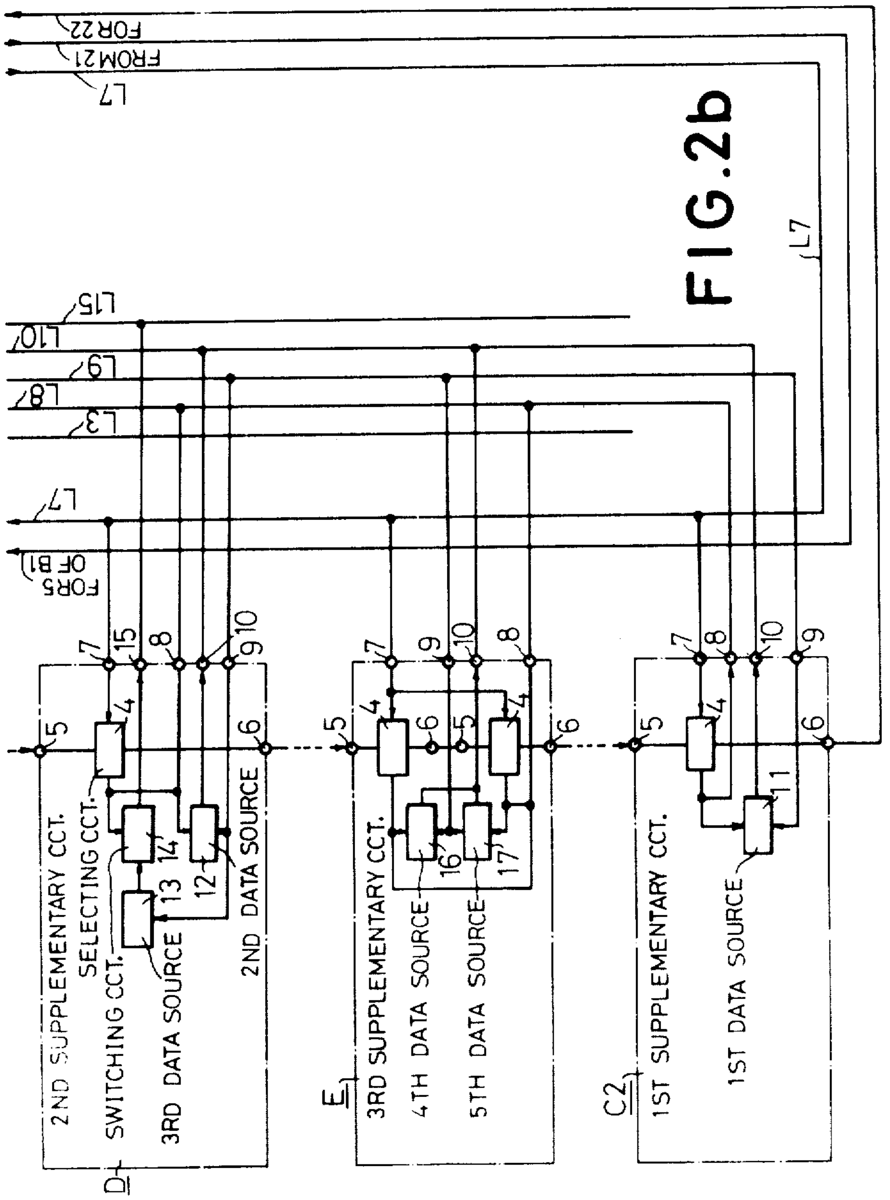

Furthermore, it is equally possible to use only plural signal input circuits shown in FIG. 2*a*; a combination of plural signal input circuits shown in FIG. 2*a* and one or plural first supplementary circuits shown in FIGS. 2*a* and 2*b*; a combination of plural signal input circuits shown in FIG. 2*a* and one or plural second supplementary circuits shown in FIG. 2*b*; a combination of plural signal input circuits shown in FIG. 2*a* and one or plural third supplementary circuits shown in FIG. 2*b*; a combination of plural signal input circuits shown in FIG. 2*a* and each one or a plurality of first and second supplementary circuits shown in FIGS. 2*a* and 2*b*, each one or a plurality of first and third supplementary circuits shown in FIGS. 2*a* and 2*b*, or each one or a plurality of second and third supplementary circuits shown in FIG. 2*b*; or a combination of plural signal input circuits shown in FIG. 2*a* and each or a plurality of first, second and third supplementary circuits.

Still furthermore, it is equally possible to use only plural signal input circuits shown in FIG. 3*a*; a combination of plural signal input circuits shown in FIG. 3*a* and one or a plurality of first, second or third supplementary circuit; a combination of plural signal input circuits shown in FIG. 3*a* and one or plural arbitrary combinations of two of first, second and third supplementary circuits shown in FIGS. 3*a* and 3*b*; or a combination of plural signal input circuits shown in FIG. 3*a* and each one or a plurality of first, second and third supplementary circuits sown in FIGS. 3*a* and 3*b*.

We claim:

1. A multichannel signal-processing system comprising: a plurality of channel signal sources, a plurality of signal input circuits corresponding to said plurality of channel signal sources respectively, a signal-processing circuit, and a control circuit for controlling said signal-processing circuit, each of said plurality of signal input circuits including a signal-switching circuit, a memory circuit with a data stored therein, a signal channel-selecting circuit, and a data-switching circuit, said signal-switching circuit being controlled and driven by an output of said signal channel-selecting circuit to deliver a signal from the corresponding one of said channel signal sources to said signal-processing circuit through a common signal line, said memory circuit being driven by a timing pulse fed thereto from said control circuit through a common timing pulse line, said data-switching circuit being controlled and driven by said signal channel-selecting circuit to deliver the data from said memory circuit to said control circuit through a common memory data line, and said signal channel-switching circuits of said plurality of signal input circuits being loop connected in the form of a ring counter through said control circuit and successively driven to deliver successively the signals of said plurality of channel signals sources to said signal-processing circuit and the datum of said memory circuits to said control circuit.

2. A multichannel signal-processing system according to claim 1 further comprising at least one first supplementary circuit, said first supplementary circuit including a first data source and a supplementary channel-selecting circuit, said first data source being controlled and driven by an output of said supplementary channel-selecting circuit and a timing pulse derived from said control circuit through said common timing pulse line to deliver a first data to said control circuit through a first common data line, and said supplementary channel-selecting circuit being inserted in the loop of said plurality of signal channel-selecting circuits at a predetermined position.

3. A multichannel signal-processing system according to claim 1 further comprising at least one second supplementary circuit, said second supplementary circuit including a second data source, a third data source, a supplementary data-switching circuit and a supplementary channel-selecting circuit, said second data source being controlled and driven by an output of said supplementary channel-selecting circuit and a timing pulse derived from said control circuit through said common timing pulse line to deliver a second data to said control circuit through a first common data line, said third data source being driven by said timing pulse, said supplementary data-switching circuit being controlled and driven by said output of said supplementary channel-selecting circuit to deliver an output of said third data source to said control circuit through said common memory data line, and said supplementary channel-selecting circuit being inserted in the loop of said plurality of signal channel-selecting circuits at a predetermined position.

4. A multichannel signal-processing system according to claim 1 further comprising at least one third supplementary circuit, said third supplementary circuit including a fourth data source, a fifth data source, a supplementary first channel-selecting circuit and a supplementary second channel-selecting circuit, said fourth and fifth data source being controlled and driven by outputs of said supplementary first and second channel-selecting circuits and a timing pulse derived from said control circuit through said common timing pulse line to deliver fourth and fifth datum to said control circuit through a first common data line and said supplementary first and second channel-selecting circuits being connected in series to each other and inserted in the loop of said plurality of signal channel-selecting circuits at a predetermined position.

5. A multichannel signal-processing system comprising a plurality of channel signal sources, a plurality of signal input circuits corresponding to said channel signal sources respectively, a signal-processing circuit, and a control circuit for control of said signal-processsing circuit, each of said plurality of signal input circuits including a signal-switching circuit, a signal channel-selecting circuit, an abnormal detector, an abnormal data-producing means, a control means and an abnormal data-switching circuit, said signal-switching circuit being controlled and driven by an output of said signal channel-selecting circuit to deliver a signal from the corresponding one of said channel signal sources to said signal-processing circuit through a common signal line, said abnormal detector detecting whether the signal from the corresponding one of said channel signal sources is abnormal or not, said abnormal data-producing means producing an abnormal data in accordance with the output of said abnormal detector and being reset by a control signal from said control means and controlled by a timing pulse derived from said control circuit through a common timing pulse line, said control means being controlled and driven by said output of said signal channel-selecting circuit and an abnormal confirmation signal derived from said control circuit through a common confirmation signal line, said abnormal data-switching circuit being controlled and driven by the output of said signal channel-selecting circuit to deliver an abnormal data to said control circuit through a common abnormal data line and said signal channel-selecting circuits of said plurality of signal input circuits being loop connected in the form of a ring counter through said control circuit and successively driven to deliver successively the signals of said plurality of channel sources to said signal-processing circuit and the abnormal datum of said abnormal data-producing means to said control circuit.

6. A multichannel signal-processing system according to claim 5 further comprising at least one first supplementary circuit, said first supplementary circuit including a first data source being controlled and driven by an output of said supplementary channel-selecting circuit and a timing pulse derived from said control circuit through said common timing pulse line to deliver a first data to said control circuit through a first common data line, and said supplementary channel-selecting circuit being inserted in the loop of said plurality of signal channel-selecting circuits at a predetermined position.

7. A multichannel signal-processing system according to claim 5 further comprising at least one second supplementary circuit, said second supplementary circuit including a second data source, a third data source, a supplementary data-switching circuit and a supplementary channel-selecting circuit, said second data source being controlled and driven by an output of said supplementary channel-selecting circuit and a timing pulse derived from said control circuit through said common timing pulse line to deliver a second data to said control circuit through a first common data line, said third data source being driven by said timing pulse, said supplementary data-switching circuit being controlled and driven by said output of said supplementary channel-selecting circuit to deliver an output of said third data source to said control circuit though said common abnormal data line, and said supplementary channel-selecting circuit being inserted in the loop of said plurality of signal channel-selecting circuits at a predetermined position.

8. A multichannel signal-processing system according to claim 5 further comprising at least one third supplementary circuit, said third supplementary circuit including a fourth data source, a fifth data source, a supplementary first channel-selecting circuit and a supplementary second channel-selecting circuit, said fourth and fifth data source being controlled and driven by outputs of said supplementary first and second channel-selecting circuits and a timing pulse derived from said control circuit through said common timing pulse line to deliver fourth and fifth datum to said control circuit through a first common data line and said supplementary first and second channel-selecting circuits being connected in series to each other and inserted in the loop of said plurality of signal channel-selecting circuits at a predetermined position.

9. A multichannel signal-processing system comprising a plurality of channel signal sources, a plurality of signal input circuits corresponding to said plurality of channel signal sources respectively at least one first supplementary circuit, a signal-processing circuit, and a control circuit for control of said signal-processing circuit, each of said plurality of signal input circuits including a signal-switching circuit and a signal channel-selecting circuit, said signal-switching circuit being controlled and driven by an output of said signal channel-selecting circuit to deliver a signal from the corresponding one of said channel signal sources to said signal-processing circuit through a common signal line, said signal channel-selecting circuits of said plurality of signal input circuits being loop connected in the form of a ring counter through said control circuit and successively driven to deliver successively the signal of said plurality of channel signal sources to said signal-processing circuit, said first supplementary circuit including a first data source and a supplementary channel-selecting circuit, said first data source being controlled and driven by an output of said supplementary channel-selecting circuit and a timing pulse derived from said control circuit through a common timing pulse line to deliver a first data to said control circuit through a first common data line, and said supplementary channel-selecting circuit being inserted in the loop of said plurality of signal channel-selecting circuits at a predetermined position.

10. A multichannel signal-processing system comprising a plurality of channel signal courses, a plurality of signal input circuits corresponding to said plurality of channel signal sources respectively, at least one second supplementary circuit, a signal-processing circuit, and a control circuit for control of said signal-processing circuit, each of said plurality of signal input circuits including a signal-switching circuit and a signal channel-switching circuit, said signal-switching circuit being controlled and driven by an output of said signal channel-selecting circuit to deliver a signal from the corresponding one of said channel signal sources to said signal-processing circuit through a common signal line, said signal channel-selecting circuits of said plurality of signal input circuits being loop connected in the form of a ring counter through said control circuit and successively driven to deliver successively the signal of said plurality of channel signal sources to said signal-processing circuit, said second supplementary circuit including a second data source, a third data source, a supplementary data-switching circuit and a supplementary channel-selecting circuit, said second data source being controlled and driven by an output of said supplementary channel-selecting circuit and a timing pulse derived from said control circuit through a common timing pulse line to deliver a second data to said control circuit through a first common data line, said third data source being driven by said timing pulse, said supplementary data-switching circuit being controlled and driven by said output of said third data source to said control circuit through a second common data line, and said supplementary channel-selecting circuit being inserted in the loop of said plurality of signal channel-selecting circuits at a predetermined position.

11. A multichannel signal-processing system comprising a plurality of channel signal sources, a plurality of signal input circuits corresponding to said plurality of channel signal sources respectively, at least one third supplementary circuit, a signal-processing circuit, and a control circuit for control of said signal-processing circuit, each of said plurality of signal input circuits including a signal-switching circuit and a signal channel-selecting circuit, said signal-switching circuit being controlled and driven by an output of said signal channel-selecting circuit to deliver a signal from the corresponding one of said channel signal sources to said signal-processing circuit through a common signal line, said signal channel-selecting circuits of said plurality of signal input circuits being loop connected in the form of a ring counter through said control circuit and successively driven to deliver successively the signals of said plurality of channel signal sources to said signal-processing circuit, said third supplementary circuit including a fourth data source, a fifth data source, a supplementary first channel-selecting circuit and a supplementary second channel-selecting circuit, said fourth and fifth data source being controlled and driven by outputs of said supplementary first and second channel-selecting circuits and a timing pulse derived from said control circuit through a common timing pulse line to deliver fourth and fifth datum to said control circuit through a first common data line and said supplementary first and second channel-selecting circuits being connected in series to each other and inserted in the loop of said plurality of signal channel-selecting circuits at a predetermined position.

* * * * *